(12) United States Patent
Moore

(10) Patent No.: US 7,871,337 B2
(45) Date of Patent: Jan. 18, 2011

(54) ADJUSTABLE MECHANISM FOR ATTACHING TWO SHAFTS

(75) Inventor: Simon Garry Moore, Cambridge (NZ)

(73) Assignee: Puku Limited, Cambridge (NZ)

( * ) Notice: Subject to any disclaimer, the term of this patent is extended or adjusted under 35 U.S.C. 154(b) by 231 days.

(21) Appl. No.: 12/162,079

(22) PCT Filed: Jan. 17, 2007

(86) PCT No.: PCT/NZ2007/000010

§ 371 (c)(1), (2), (4) Date: Oct. 3, 2008

(87) PCT Pub. No.: WO2007/086759

PCT Pub. Date: Feb. 8, 2007

(65) Prior Publication Data

US 2009/0036227 A1 Feb. 5, 2009

(30) Foreign Application Priority Data

Jan. 24, 2006 (NZ) ..................................... 544906
Dec. 20, 2006 (NZ) ..................................... 551189

(51) Int. Cl.
A63B 53/16 (2006.01)
(52) U.S. Cl. ..................................... 473/296; 403/109.8
(58) Field of Classification Search ............... 473/239, 473/296–299, 316–323; 29/227; 403/109.1, 403/109.8

See application file for complete search history.

(56) References Cited

U.S. PATENT DOCUMENTS

| 1,774,385 | A | * | 8/1930 | Lard ........................... 473/319 |
| 3,713,604 | A | * | 1/1973 | Foley ........................ 242/118.2 |
| 3,814,347 | A | * | 6/1974 | Moren, Jr. .................. 242/125.1 |
| 4,330,916 | A | * | 5/1982 | Dannatt |
| 4,421,133 | A |   | 12/1983 | Huang |
| 4,986,294 | A |   | 1/1991 | Wu |
| 5,947,654 | A |   | 9/1999 | Blankenship et al. |
| 6,875,123 | B2 | * | 4/2005 | Wilson ........................ 473/239 |
| 7,428,928 | B2 | * | 9/2008 | Cho et al. .................... 166/285 |
| 7,467,787 | B2 |   | 12/2008 | Adoline et al. |
| 7,686,059 | B2 | * | 3/2010 | Jarosinski et al. ......... 160/84.03 |
| 2005/0009620 | A1 | * | 1/2005 | Hodgetts ..................... 473/300 |

FOREIGN PATENT DOCUMENTS

CA 2076821 2/1994

* cited by examiner

Primary Examiner—Stephen L. Blau
(74) Attorney, Agent, or Firm—Greer, Burns & Crain, Ltd.

(57) ABSTRACT

An adjustable mechanism including at least two shafts, one of which is hollow, including: a spring attached to a first shaft; the spring having an outer diameter of similar dimensions to the internal diameter of the second shaft, the spring configured such that once force is applied to the spring, its outer diameter is less than the inner diameter of the second shaft; and when force is no longer applied to the spring it is biased to return to its original outer diameter to bear against the inner diameter of the second shaft.

3 Claims, 3 Drawing Sheets

ADJUSTABLE MECHANISM FOR ATTACHING TWO SHAFTS

TECHNICAL FIELD

This invention relates to a friction mechanism.

In particular, the present invention relates to friction mechanism used to attach two shafts together. In preferred embodiments, the present invention is used to attach shafts with respect to each other in variable positions.

BACKGROUND ART

Use of the present invention shall be described throughout the specification in relation to golf putters. However, it should be appreciated that the principles of the present invention can be used in relation to attaching other shafts in relation to each other and golf putters is just one preferred embodiment of the present invention.

For example, Canadian Patent Number 2,076,821 relates to an umbrella shaft which uses a spring to position to the shafts relative to each other, so that the shaft can effectively telescope. However, this is not a strong or fixed engagement as this relies on the use of pawls at the end of the spring to hold the shafts. There is no strong frictional engagement.

Golf is a popular recreational game, the object of which is to be able to direct a golf ball into a hole on a green. This is usually done by using a specialised golf club called a putter.

This is usually the trickiest part of the golf game and a common axiom is "drive for show, putt for dough". This phrase highlights that it is the putting game that determines the success in golf.

Putters come in various forms, commonly called either short, mid (or belly) or long putters. While each of these different types of putters are used differently, a common disadvantage to all is that depending on the height of the golfer, different lengths of putters are required.

There have been many attempts to address this problem and the following patents are representative of these.

Middleton, U.S. Pat. No. 5,733,203, describes a telescoping putter, with 2 shafts, with a "locking screw" to secure the shaft.

Harrison, U.S. Pat. No. 5,649,870, describes a telescopic shaft arrangement where simple friction secures the two telescoping tapered shafts in a semi fixed position.

Mazzocco, U.S. Pat. No. 4,674,747, discloses a golf club having adjustable length shaft retractable between fully extended a collapsed positions. The golf club has plural concentric telescopic interlocking tubular sections which produce a friction lock between the tubular sections in a fully extended positions. There is a club commercially available utilizing this principle (http://www.allinoneglofclub.com).

Sundin, U.S. Pat. No. 5,584,769, describes a shaft which can be constructed of two or more telescopically-adjustable or collapsible members to allow the same to adjust to different lengths for individual golfers. However, Sundin does not specify how the two shafts are to be secured in position.

Lee, U.S. Pat. No. 5,569,096, describes "the shaft inserted into the handle, threadably tightening a locking nut over a flexible ring and a external thread until the flexible ring with squeezed over the shaft prevents the shaft from slipping—thereby effectively locking the shaft in the desired length".

Napolitano, U.S. Pat. No. 5,282,619, describes a shaft which has a number of telescopic sections where a locking nut and a compression ring permit adjacent sections of the telescopic section to be locked in a fixed position relative to each.

Whilst all the above patented inventions technically allow adjustment, none are both variable in length and in accordance with the Rules of Golf.

The Rules of Golf do not allow readily made adjustment to clubs, and until May 5, 2002 an adjustable length putter has never been determined as legal by the United States Golf Association.

The United States Golf Association is very careful about inadvertent adjustment of golf clubs or putters, and any mechanisms which require either a common tool such as a screwdriver or coin to use, or have no tool.

The current rules as to the limitations of what is and is not allowed as part of an adjustable putter, include the following:

"Appendix II, 1b states that:

Woods and irons must not be designed to be adjustable except for weight. Putters may be designed to be adjustable for weight and some other forms of adjustability are also permitted. All methods of adjustment permitted by the Rules require that:
  i. the adjustment cannot be readily made;
  ii. all adjustable parts are firmly fixed and there is no reasonable likelihood of them working loose during a round; and
  iii. all configurations of adjustment conform with the Rules.

The disqualification penalty for purposely changing the playing characteristics of a club during a stipulated round (Rule 4-2a) applies to all clubs including a putter.

(i) General

In order to preserve the integrity of Rule 4-2 (Playing Characteristics Changed), this rule clearly states that it must not be too easy for a slayer to make adjustments during the course of a stipulated round. This is interpreted to mean that adjustments must require the use of a special tool, such as an Allen key or a Phillips screwdriver. It must not be possible to make the adjustment lust by using the fingers, or something which would normally be kept in a golfer's pocket, such as a coin or a pitch-mark repair tool.

The above restrictions have been included in the Rules in order to encourage the player to make all of the necessary adjustments to his clubs before teeing off, and to protect him from either unwittingly or purposely making adjustments during a round . . . .

Appendix II, 1a states that:

(iii) All parts must be fixed.

This is interpreted to mean that no part of the golf club should be designed to move, nor should it be promoted as doing so. Therefore, if any part of a club were to incorporate moving powder, pellets, liquid, vibrating wires, rollers, tuning forks, or any number of other features which could be considered a "moving part," it would be in breach of this rule."

The inventor of the present invention has attempted to address these issues through his invention as identified in PCT Application No. PCT/NZ02/00123.

This invention is the first invention ever that has been approved by the United States Golf Association for a length adjustable putter.

Problems with previous friction mechanisms include the external bulky nature of the mechanism. This extends out of the shaft and prevents a grip being fitted over the join/mechanism.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided an adjustable mechanism including at least two shafts, one of which is hollow, characterised in that the mechanism includes, a spring attached to a first shaft, the spring having an outer diameter of similar dimensions to the internal diameter of the second shaft, the spring configured such that once force is applied to the spring its outer diameter is less than the inner diameter of the second shaft, and when force is no longer applied to the spring it is biased to return to its original outer diameter to bear against the inner diameter of the second shaft.

According to another aspect of the present invention there is a provided a method of holding together two shafts wherein one of the shafts is hollow, characterised by the steps of:
a) ensuring a spring is attached to one end of the first shaft, and
b) inserting a spring engagement tool into the second hollow shaft, and
c) engaging the spring with the spring engagement tool, and
d) applying a force to the spring with the spring engagement tool in order to reduce the outer diameter of said spring, and
e) sliding the second shaft through which the spring engagement tool is threaded over the reduced diameter spring in order to position the shafts relative to each other, and
f) allowing the spring to bias towards its original diameter thereby providing friction fit through bearing against the inner surface of the second shaft.

In some embodiments disengagement of the spring engagement may achieve the last step. However, this is not necessary.

The term shaft as used throughout this specification should be taken as meaning an internal wall. The internal wall is irrespective of the surrounding material.

It should therefore be appreciated that the term shaft may include a hole cut through a flat piece of material or plate/engine housing. In this instance the hole acts as the shaft, and contains the necessary internal diameter which allows the present invention to work.

In a preferred embodiment the shaft is a hollow length of material, such as a golf club handle.

According to a further aspect of the present invention there is provided a kitset which includes at least two shafts, at least one of which is hollow, a spring of a size and configuration so as to be able to closely cooperate with the internal diameter of at least one shaft, and a spring engagement tool capable of engaging the spring and applying force to same.

Reference throughout this specification will now be made to the use of the present invention in relation to golf putters.

It should be appreciated however that the present invention has applications far beyond this narrow field and while the present invention is especially suited for golf clubs, it can have application in other areas. These areas can include ladders, scaffolding and props in building industries, bicycle seat posts, furniture, walking canes, tent poles, machine tool holders/chucks, ski poles and other consumer products.

While the present invention will be discussed as connecting together two shafts, it should be appreciated that the present invention can be used to connect together multiple shafts or other devices and two shafts is just given as a simple embodiment of the present invention.

Where the present invention is used for golf clubs (and preferably putters), the shafts are envisaged to be of a similar width and type as those from which a traditional golf club is made.

Reference throughout this specification will herein be made to golf putters.

It should be appreciated that unlike other golf clubs, it is the length of the putter and its head which most determine the success of the stroke (along with the golfer's technique), rather than the flexibility and other material properties of the shaft.

This is because a golf putter is used to give small measured strokes from below the shoulder of the golfer. This is in contrast to other clubs where the head of the club is lifted above that of the shoulder, this movement in combination with the material properties of the shaft itself providing the required impact to the golf ball.

In some embodiments of the present invention the shaft may be split, but in a manner that will still resist the outer forces of the spring therein—thereby still ensuring that a friction fit is achieved.

The term "anchored" as used throughout this specification should be taken to include instances where the spring is manufactured independently and subsequently joined to the shaft, as well as instances where the spring is formed integrally with, or cut out of the shaft.

In one embodiment of the present invention the spring depends directly from the end of one of the shafts. This should not be seen as limiting, as the spring may be a separate item capable of attaching to one or both of the shafts in the securing action.

Alternatively, the spring may be formed integrally with, or formed or cut out of the shaft.

If the spring is attached to the shaft, this may be by a number of means.

In one embodiment, the spring may be welded thereto or adhered with an adhesive, or frictionally engaged by winding into the shaft or housing hole as the case may be.

Throughout this specification the term "spring" may be taken to be a coiled spring as commonly visualized, attached or integral, or an element, attached or integral, which acts like a spring in some manner, by altering its length and external dimension.

In preferred embodiments it is envisaged that one end of the spring has been wound into the shaft and permanently secured therewithin. In addition to adhering or welding, there may be provided a filler material which holds the spring against the shaft, or it may be that the frictional fit between the outer diameter of the spring and the internal diameter of the shaft is sufficient to hold it firmly in place.

It is envisaged that in one embodiment the inner and outer diameters of both shafts with respect to each other will be substantially the same so that the putter shaft once assembled has a relatively smooth outside with little evidence of it being made out of two or more shaft lengths.

In other embodiments, the second shaft may have an inner diameter which is greater than the outer diameter of the first shaft. This allows the second shaft to pass over the spring and the first shaft. This particular embodiment is most suitable for a telescoping action for the shaft length.

In yet other embodiments, the purpose of the present invention may not be to have the shafts form different lengths when combined, but merely a way to have a means by which a golf putter can be readily assembled and dismantled. In this embodiment the outer diameter of the shafts may be substantially the same as each other and the ends thereof may abut when the shafts are fitted over the spring.

It is envisaged that the spring will have an outer diameter of a similar dimension to the inner diameter to the shaft into which it is to be fixed. The term "similar diameter" should be taken to mean that the spring is capable of having its diameter reduced for insertion into the shaft, but once the shaft is in position, the natural outer diameter of the spring is of a size that will be against the shaft forming a frictional fit, but without substantially deforming same.

The spring may be made of any dimensions or configurations to enable it to be forced in order to reduce its outer diameter for insertion to the shaft, and then upon release expand to a suitable size that fits within the shaft.

The outer diameter of the spring may be reduced by various means.

In one embodiment, the end of the spring may be pulled by the spring engagement tool causing the spring to stretch and likewise the outer diameter of the spring to reduce.

In preferred embodiments, however it is envisaged that a torsional or twisting action can be applied to the spring causing the spring to wind in tighter and likewise have its outer diameter reduced.

In some embodiments of the present invention one or both ends of the spring may have a smaller outer diameter than the centre of the spring. This may be used to gradually introduce the spring inside a shaft enabling the spring to then gain purchase on the inside of the shaft before the larger diameter part of the spring is introduced thereto.

In some embodiments of the present invention there may be provided a tool which can apply a force to the spring, thus causing the spring's outer diameter to reduce.

In preferred embodiments the tool includes a handle attached to an elongate shaft, and at the distal end thereof there is a spring engaging mechanism.

Preferably the handle of the tool is of a shape and size that is easy to grasp and exert a twisting or pulling motion to the shaft of the tool.

Preferably the shaft of the tool is a sufficient length that the spring engaging mechanism can be passed through one end of a length of the putter shaft to be attached and emerge out from the other end thereof with the handle of the engagement tool still being accessible to the user to twist.

The spring engagement device at the end of the tool may come in a variety of forms. In one embodiment of the present invention the spring engagement device is merely a notch in the end of the shaft of the tool. This notch is preferably of a shape and configuration that it can fit over the spring near the end thereof and hold same during a twisting motion.

In some embodiments of the present invention the notch is in the form of a key hole, requiring some force to push the notch over the spring before it is held in a slightly larger recess.

Thus it can be seen that in one embodiment of the present invention, that a golf putter can be assembled as follows.

Firstly the user passes the spring engagement tool through one shaft length (say with the putter handle) of the putter so that the spring engagement mechanism at the end of the tool extends therefrom. Next, the user places another shaft (say with the putter head) with a spring already extending therefrom and aligns the substantially with handle first shaft.

The spring engagement notch is then pushed over the end of the spring on the putter head shaft and then rotated with respect thereto. This rotating or torsional action causes the outer diameter of the spring to reduce, particularly if the spring engagement tool is pulled from the second shaft.

The reduction of the outer diameter of the spring enables the handle shaft to slide down over the spring engagement tool and the spring itself. The positioning of the handle shaft with respect to the spring in respect to each other can then be chosen by the user and the spring engagement tool subsequently disengaged from the spring. This enables the spring to return to bias towards its original outer diameter causing a secure friction fit by bearing against the inner diameter of the handle shaft that was placed thereover.

BRIEF DESCRIPTION OF DRAWINGS

Further aspects of the present invention will become apparent from the ensuing description which is given by way of example only and with reference to the accompanying drawings in which.

BEST MODES FOR CARRYING OUT THE INVENTION

Figure 1:
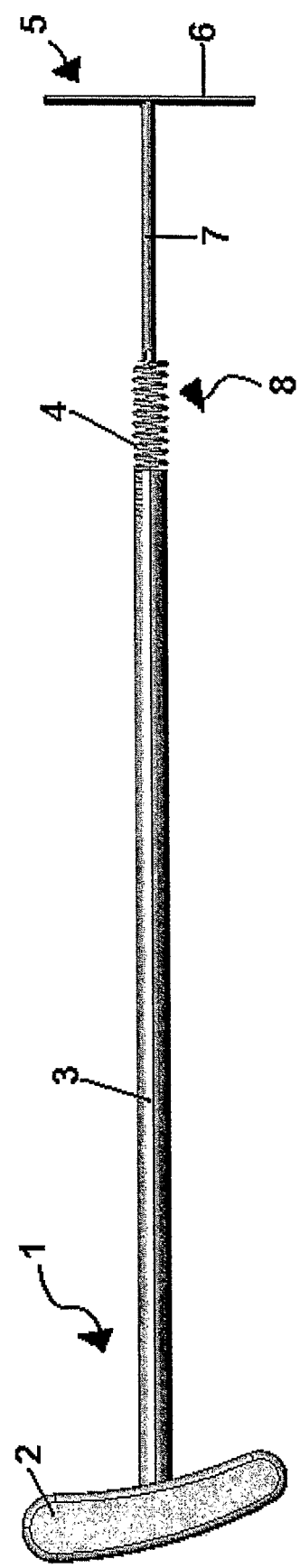
FIG. 1 is a diagrammatic view of a putter in accordance with one embodiment of the present invention.

FIG. 1 illustrates one embodiment of the present invention as used with a putter generally indicated by arrow (1).

The putter has a head (2) to which is attached a first shaft (3).

Extending from the first shaft (3) is a spring (4) which is permanently fixed to same.

At the end of the spring (4) is a removable spring engagement tool (5).

The spring engagement tool (5) includes a handle (6), a shaft (7) and a spring engagement device generally indicated by arrow (8).

Figure 2:
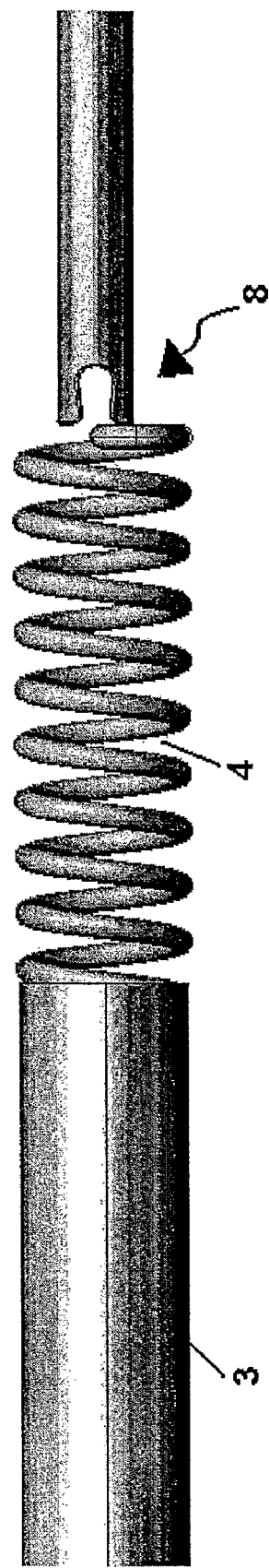
FIG. 2 is a close up of an attachment mechanism in accordance with one embodiment of the present invention.

FIG. 2 illustrates more clearly the spring engagement device (8) relative to the spring (4).

In this illustration, it can be clearly seen that the spring engagement device (8) is in the form of a key hole shaped notch. This notch is of a size and configuration that can be readily pushed over the end of the spring and remain secure thereto during a twisting action exerted upon the spring (4).

Figure 3:
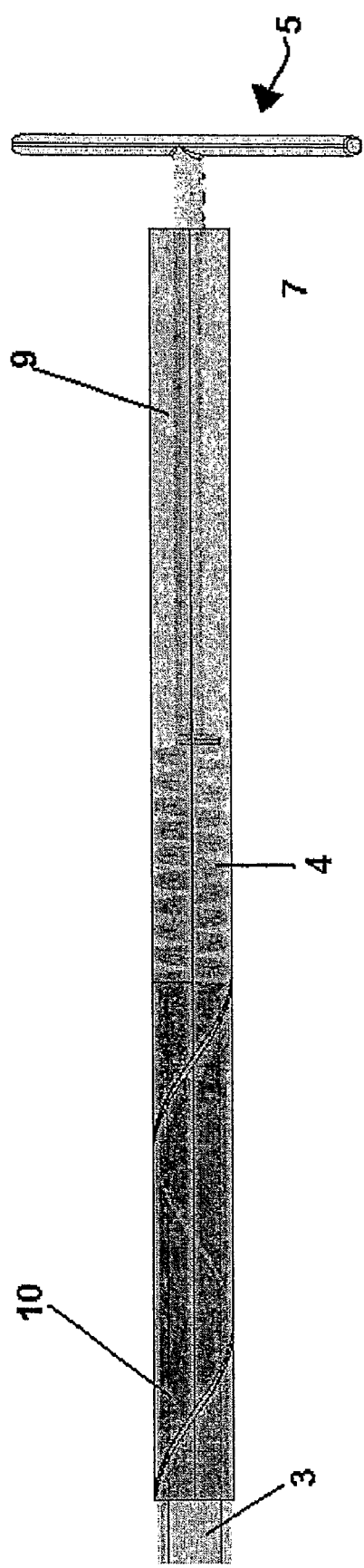
FIG. 3 is a diagrammatic view of the two shafts fitted together in accordance with one embodiment of the present invention.

FIG. 3 illustrates an alternative embodiment of the present invention showing the operation of the spring engagement tool (5) relative to the two shafts (3) and (9) which are to be connected.

In this embodiment, the shaft (9) has a greater inner diameter than the outer diameter of the shaft (3). This allows the shaft (9) to pass over the spring (4) and the shaft (3) when being connected thereto.

The shaft (9) also has a spiral split (10) which enables the shaft (9) to more readily fit over the shaft (3) and then relax against thereto once in position.

Thus, it can be seen that the present invention provides an easy way to provide a variable length friction fit mechanism that can be used for shafts of golf putters and other devices.

Aspects of the present invention have been described by way of example only and it should be appreciated that modifications and additions may be made thereto without departing from the scope thereof as defined in the appended claims.

I claim:

1. A golf club incorporating an adjustable mechanism including at least two shafts, one of which is hollow, comprising:
   a spring attached to an end of a first shaft and extending away from the first shaft;
   the spring having an outer diameter of similar dimensions to the internal diameter of the second shaft,
   the spring configured such that once force is applied to the spring, its outer diameter is less than the inner diameter of the second shaft; and
   when force is no longer applied to the spring it is biased to return to its original outer diameter to bear against the inner diameter of the second shaft.

2. The mechanism as claimed in claim 1, wherein at least one of the shafts is split.

3. The golf club as claimed in claim 1, wherein at least one end of the spring has a smaller outer diameter than the centre of the spring.

* * * * *